(12) United States Patent
Greenwood et al.

(10) Patent No.: US 8,393,990 B2
(45) Date of Patent: Mar. 12, 2013

(54) CONTINUOUSLY VARIABLE TRANSMISSION

(75) Inventors: Christopher John Greenwood, Preston (GB); Philip Duncan Winter, Blackburn (GB); David Burt, Chorley (GB)

(73) Assignee: Torotrak (Development) Limited, Leyland, Lancashire (GB)

( * ) Notice: Subject to any disclaimer, the term of this patent is extended or adjusted under 35 U.S.C. 154(b) by 303 days.

(21) Appl. No.: 12/676,356

(22) PCT Filed: Sep. 3, 2008

(86) PCT No.: PCT/GB2008/050777
§ 371 (c)(1),
(2), (4) Date: Jul. 26, 2010

(87) PCT Pub. No.: WO2009/030948
PCT Pub. Date: Mar. 12, 2009

(65) Prior Publication Data
US 2010/0282020 A1   Nov. 11, 2010

(30) Foreign Application Priority Data

Sep. 4, 2007 (GB) .................................. 0717143.2

(51) Int. Cl.
*F16H 37/02* (2006.01)
(52) U.S. Cl. ........................................................ 475/216
(58) Field of Classification Search ........................ None
See application file for complete search history.

(56) References Cited

U.S. PATENT DOCUMENTS 4,976,666 A    12/1990   Meyerle
(Continued)

FOREIGN PATENT DOCUMENTS

DE    199 44 792    4/2000
(Continued)

OTHER PUBLICATIONS

PCT International Search Report for PCT Counterpart Application No. PCT/GB2008/050777 containing Communication relating to the Results of the Partial International Search Report, 4 pgs., (Apr. 9, 2009).

(Continued)

*Primary Examiner* — Dirk Wright
(74) *Attorney, Agent, or Firm* — Blakely, Sokoloff, Taylor & Zafman LLP.

(57) ABSTRACT

The invention is concerned with a continuously variable transmission incorporating a variator of the type having at least two co-axial races (D1-D4) between which drive is transferred at a continuously variable variator ratio. The variator races are mounted for rotation about a variator shaft (16). The transmission has a layshaft (18) which is laterally separated from the variator shaft. It has two epicyclic gears. A splitter epicyclic (14) has an input member driven from the transmission input (10) and two output members arranged respectively to drive the layshaft and the variator shaft. A recirculater epicyclic has first and second input members for coupling respectively to the variator shaft and to the layshaft and a recirculater output member. An arrangement of clutches is provided for selectively engaging any of at least three regimes. In one regime the recirculater output member drives the transmission output. In another the layshaft drives the transmission output. In a third, the variator shaft drives the transmission output. The arrangement of the components is such that the variator shaft is co-axial with the transmission output, the recirculater epicyclic, a first coupling, between the recirculater output member and the transmission output, which serves to drive the transmission output in the first regime, and a second coupling, between the variator shaft and the transmission output, which serves to drive the transmission output in the third above-mentioned regime.

14 Claims, 9 Drawing Sheets

U.S. PATENT DOCUMENTS

| | | | |
|---|---|---|---|
| 5,564,998 A | 10/1996 | Fellows | |
| 5,643,121 A | 7/1997 | Greenwood et al. | |
| 5,720,687 A | 2/1998 | Bennett | |
| 6,045,477 A | 4/2000 | Schmidt | |
| 6,155,951 A | 12/2000 | Kuhn et al. | |
| 6,171,210 B1 * | 1/2001 | Miyata et al. | 475/216 |
| 6,931,316 B2 * | 8/2005 | Joe et al. | 701/61 |
| 2002/0042319 A1 | 4/2002 | Otten et al. | |
| 2006/0183590 A1 | 8/2006 | Jackson | |
| 2007/0021259 A1 | 1/2007 | Tenberge | |

FOREIGN PATENT DOCUMENTS

| | | |
|---|---|---|
| DE | 10 2005 005 668 | 2/2006 |
| GB | 2 407 853 | 5/2005 |
| JP | 61096258 | 5/1986 |
| WO | WO 94/16244 | 7/1994 |
| WO | WO 94/24462 | 10/1994 |
| WO | WO 2005/108825 | 11/2005 |

OTHER PUBLICATIONS

Patents Act 1977: Search Report under Section 17 for United Kingdom Counterpart Application No. GB0717143.2, 1 pg., (Dec. 19, 2007).

Patents Act 1977: Further Search Report under Section 17 for United Kingdom Counterpart Application No. GB0717143.2, 1 pg., (Jan. 18, 2008).

Patents Act 1977: Further Search Report under Section 17 for United Kingdom Counterpart Application No. GB0717143.2, 2 pgs., (Feb. 15, 2008).

* cited by examiner

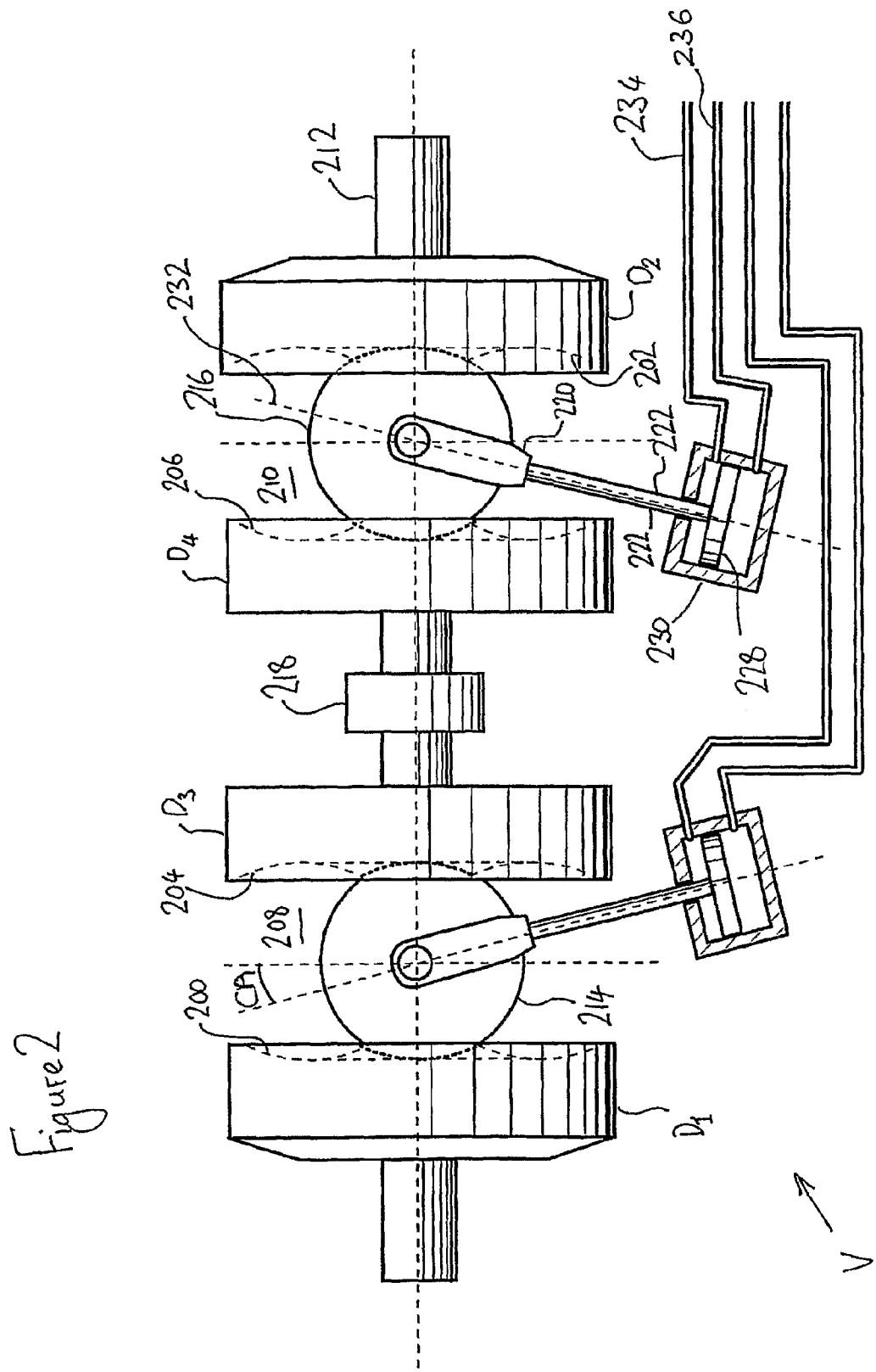

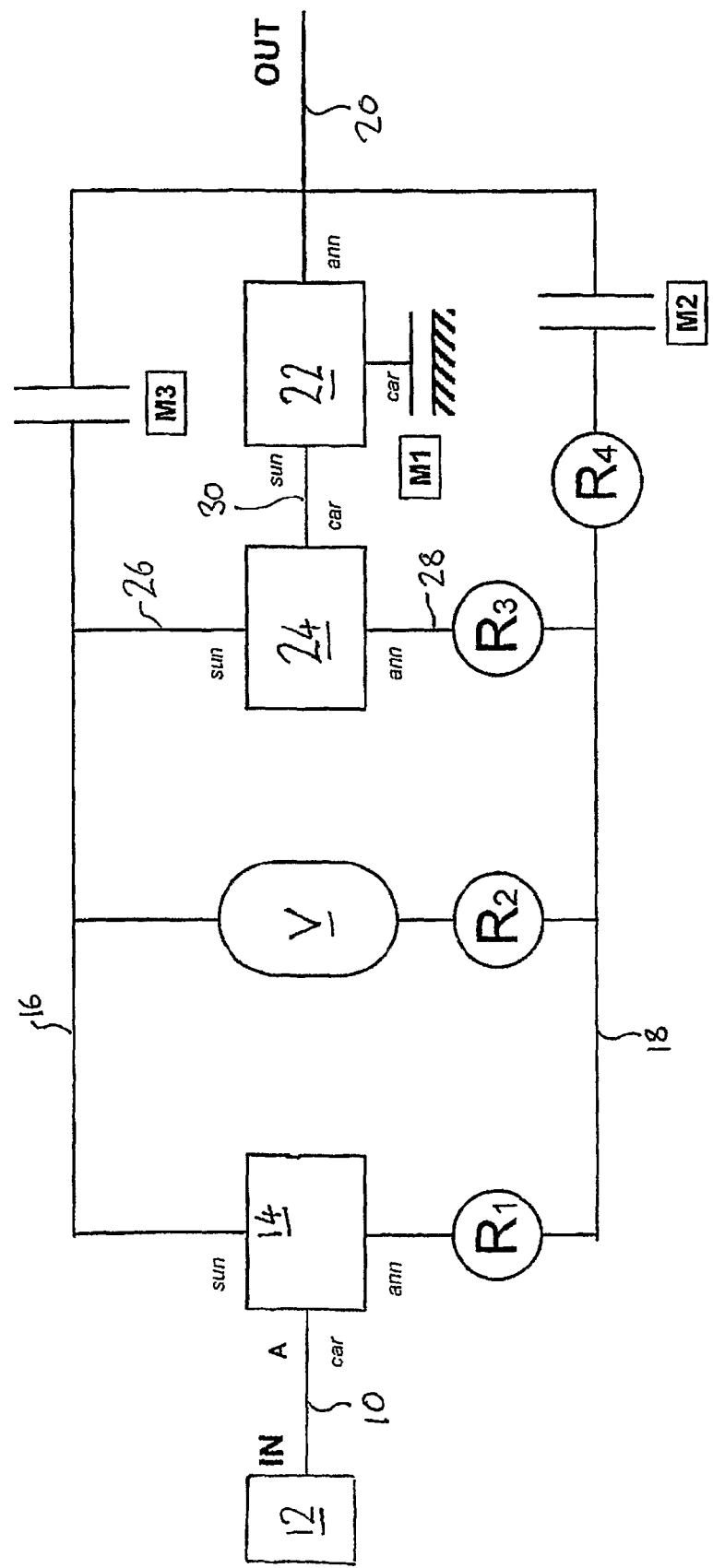

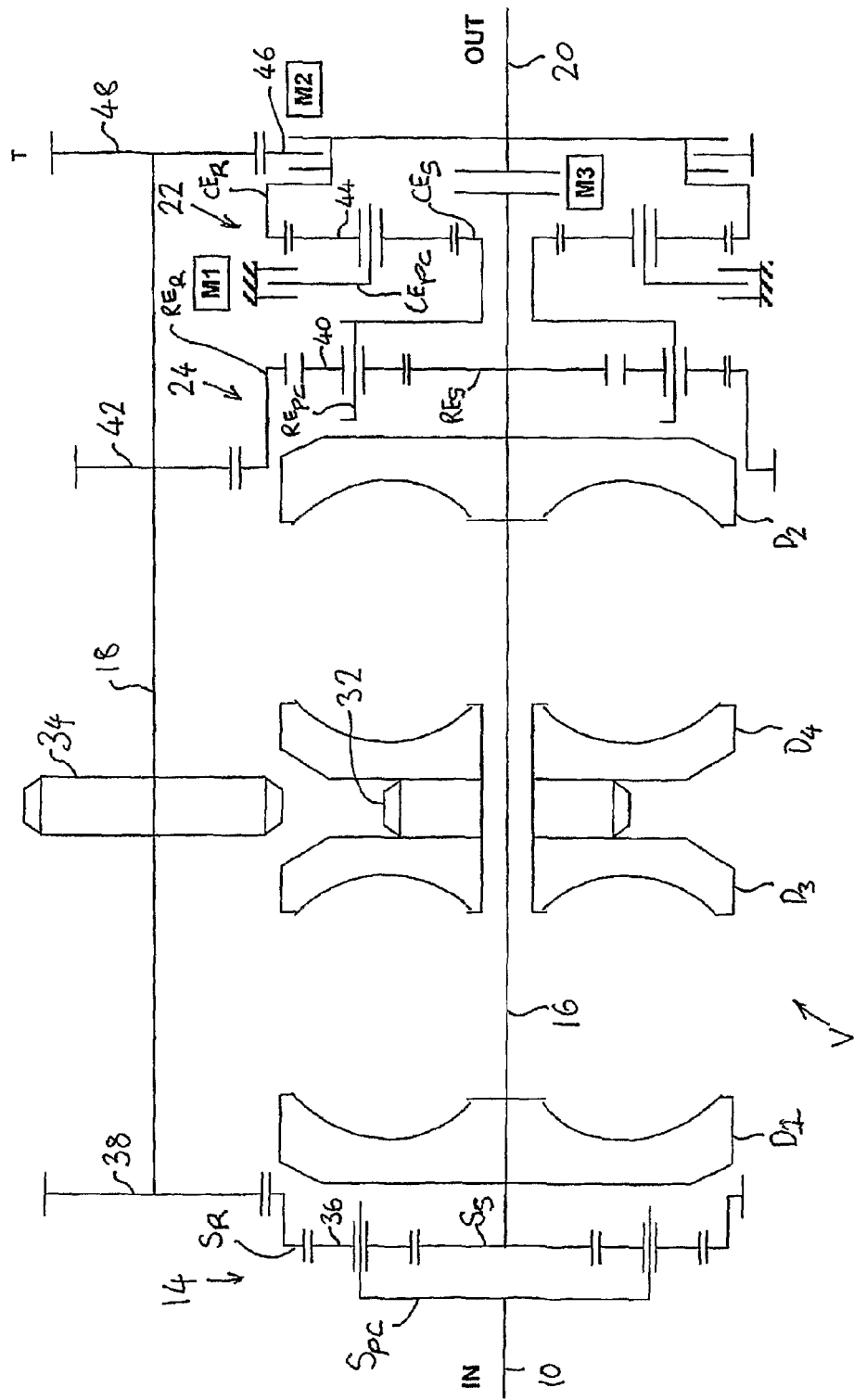

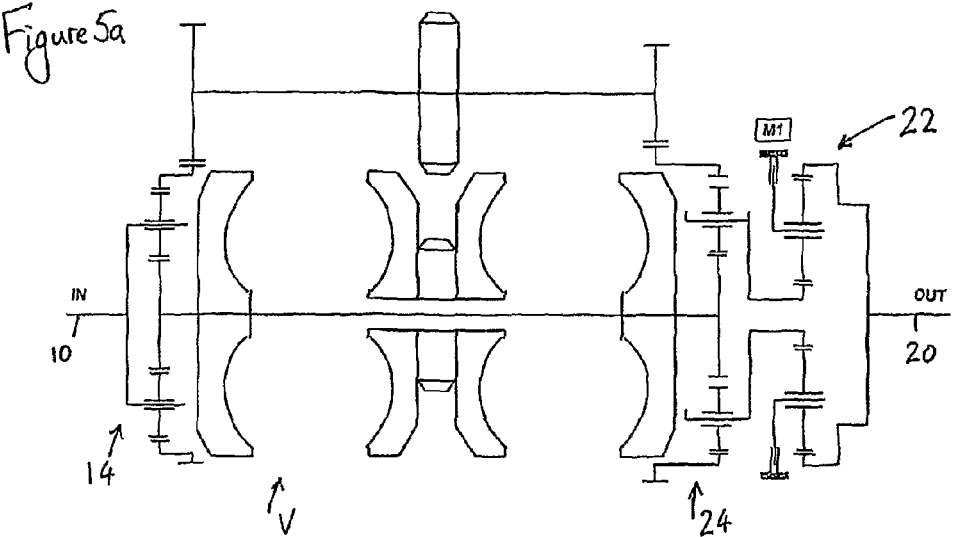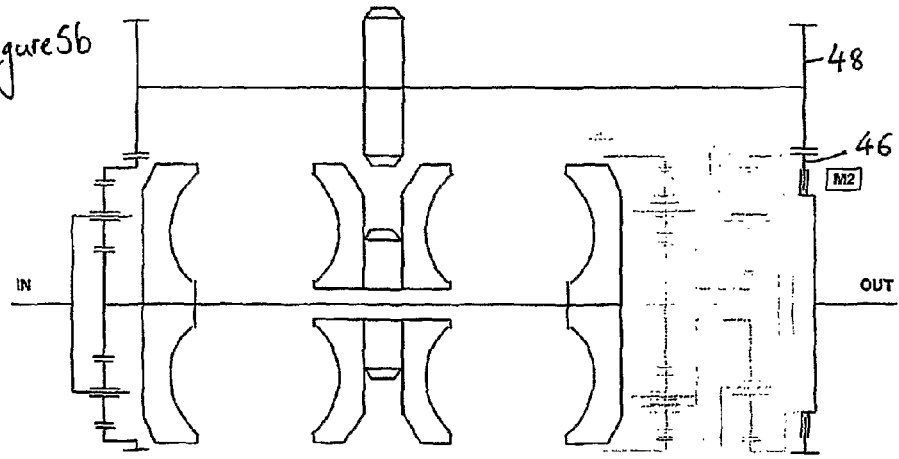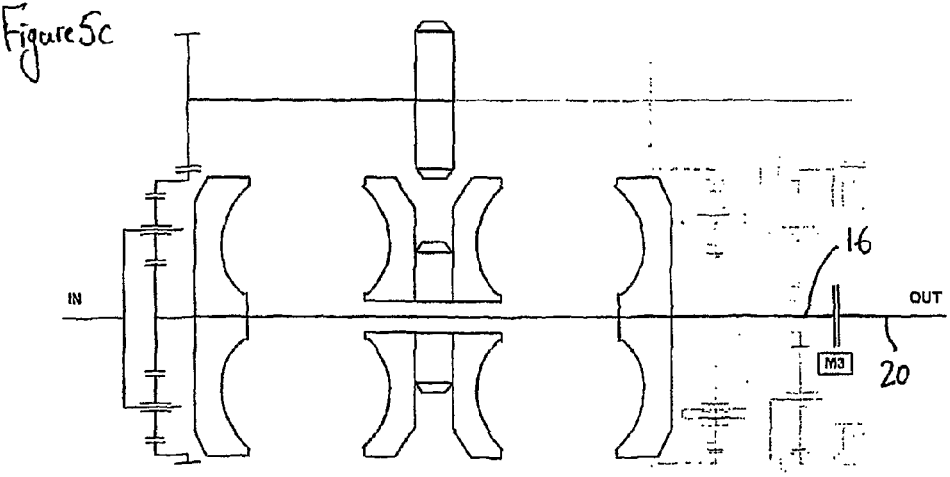

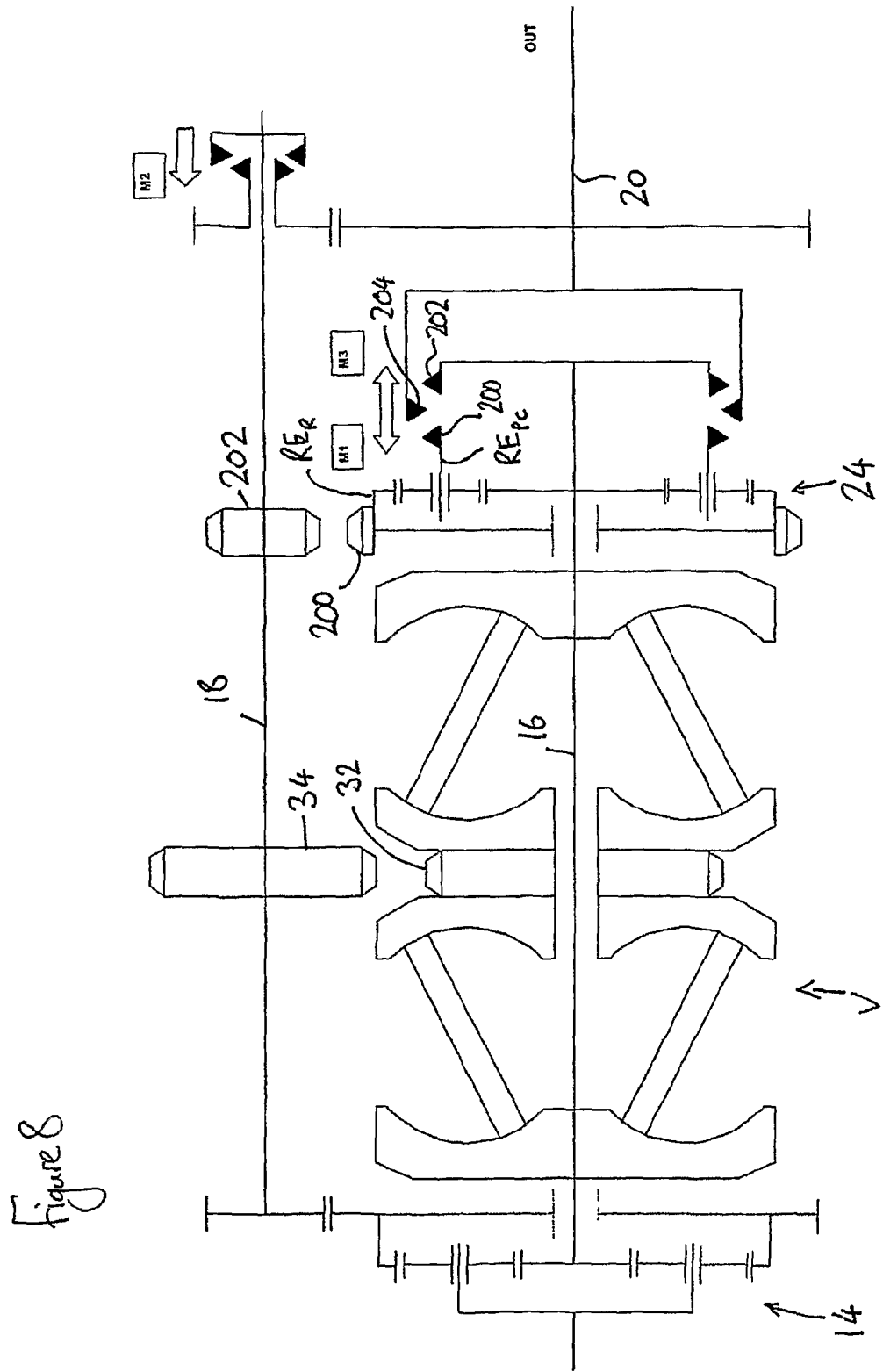

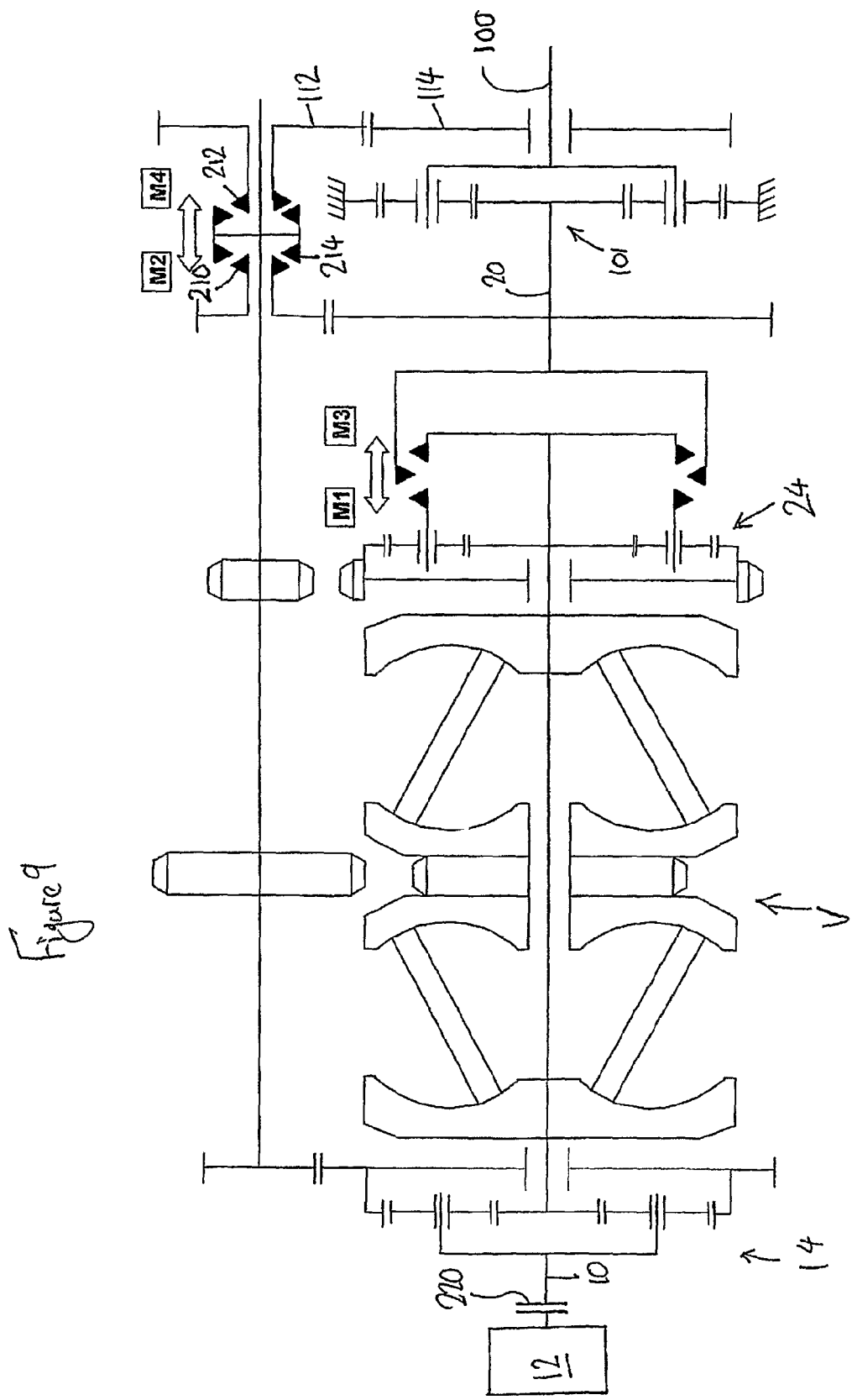

CONTINUOUSLY VARIABLE TRANSMISSION

CROSS-REFERENCE TO RELATED APPLICATIONS

This patent application is a U.S. National Phase application under 35 U.S.C. §371 of International Application No. PCT/GB2008/050777, filed on Sep. 3, 2008, entitled CONTINUOUSLY VARIABLE TRANSMISSION, which claims priority to Great Britain patent application number 0717143.2. filed Sep. 4, 2007.

FIELD

The present invention is concerned with continuously variable transmissions of the type which are operable in multiple regimes.

BACKGROUND

A continuously variable transmission ("CVT") typically incorporates:—
(a) a variator—a device having a rotary input and a rotary output which is able to vary the ratio of its input speed to its output speed (the "variator ratio") in a stepless manner, and
(b) associated gearing by means of which the variator is coupled between a rotary power source, such as an engine, and a point of power usage, for example the driven wheels of a motor vehicle.

The overall speed ratio provided by the transmission as a whole (the "transmission ratio") is a function of the variator ratio, but generally not identical to it, being modified by the associated gearing.

It is well known to incorporate in the gearing a "shunt" gear arrangement, typically of epicyclic type. Shunt gears can serve to recirculate power, reducing the power handled by the variator itself, and to provide a condition known in the art as "geared neutral". The shunt typically has two rotary inputs coupled to opposite sides of the variator, and a rotary output coupled e.g. to the final gearing and so to the vehicle wheels. At a certain variator ratio (the "geared neutral ratio") the two inputs to the shunt cancel each other out, leaving the output stationary. This condition is referred to as "geared neutral" and enables the transmission output to be brought to a halt without it being physically de-coupled from the moving engine. Such a transmission can thus be used without any "starting device", such as the manual clutch or torque converter of a conventional automotive transmission, used to couple/decouple engine and transmission upon vehicle launch and upon braking of the vehicle to rest. Variator ratios to one side of the geared neutral ratio provide reverse output rotation and reverse vehicle travel. Variator ratios to the other side of the geared neutral ratio provide forward output rotation and forward vehicle travel. When the variator is at the geared neutral ratio the driven wheels and the vehicle are at a halt.

Typically the gearing of a CVT incorporates one or more clutch devices, engagement/disengagement of which allows the transmission to switch between "regimes". Transmission ratio is a function of variator ratio, but in each regime the relationship between variator ratio and transmission ratio is different. For example, motor car transmissions are often designed to provide two regimes—high and low. Low regime provides reverse, geared neutral and low forward gears. High provides higher forward gears.

Ratios are selected in the gearing such that when the variator reaches a certain variator ratio (the "synchronous ratio") close to one end of its range, a change from low to high regime causes no change in transmission ratio. A regime change at synchronous ratio can be made smoothly, without large discontinuity in the torque at the vehicle wheels or change of engine speed.

The use of multiple regimes is desirable with regard to the transmission's energy efficiency. The variator itself is typically the least efficient part of the transmission. In any given regime, if the spread of ratios provided by the transmission as a whole is greater than the ratio spread of the variator, then the shunt is "power split". That is, only part of the total power is transmitted through the variator. Reducing the ratio spread in a given regime reduces the proportion of the total power through the variator, and so can improve efficiency and reduce the necessary dimensions and specification of the variator itself. For such reasons it can in some cases be desirable to provide more than two regimes. Large road-going trucks provide one example. Energy efficiency is an important consideration for such vehicles and their engines create particularly high power and torque, the handling of which by the variator could be problematic in a two regime transmission.

A known example of a CVT operable in three or more regimes is provided in published international patent application WO 94/24462, in the name of Torotrak (Development) Limited. Its United States counterpart is U.S. Pat. No. 5,643, 121. The transmission in question uses two epicyclic shunt gears. One of these is referred to in that document as the "power splitting" epicyclic because it receives power from the engine and splits it between first and second shafts, accommodate changes in their relative speeds. The variator itself has its input connected to the first shaft and its output connected to the second shaft, so (for a fixed engine speed) an increase in variator ratio causes the second shaft to speed up and the first shaft to slow down, whilst a decrease in variator ratio causes the second shaft to slow down and the first to speed up. Each shaft is able to be selectively coupled to the vehicle wheels via at least one clutch/gear arrangement. Consider what happens as transmission ratio is increased. Initially, say, the first shaft is connected to the wheels via a first clutch/gear arrangement. The second shaft is disconnected and so freewheels. The variator is swept through its ratio range to increase the speed of the first shaft and the speed of the driven wheels. Eventually the variator reaches the end of its ratio range and a synchronous regime change is initiated, disconnecting the first shaft and connecting the second shaft to the wheels through a second clutch/gear arrangement. At this point the direction of change of the variator ratio is reversed. The variator is then swept back through its ratio range, increasing the speed of the second shaft and of the driven wheels. When it reaches the opposite end of its ratio range, a change to a still higher regime can be made by disconnecting the second shaft and connecting the first shaft to the wheels through a third clutch/gear arrangement. In principle, by providing each shaft with multiple clutch/gear arrangements for driving the wheels at different ratios, any number of regimes can be provided.

The second of the shunt gears is referred to in WO 94/24462 as the "power recirculating" epicyclic and serves to provide a low regime, containing geared neutral. Its inputs are connected across the variator and its output is connectable via a clutch to the driven wheels. In low regime, the first and second shafts are both disconnected from the wheels which are instead driven by the output of the power recirculating epicyclic.

The design and layout of such a transmission is problematic. WO 94/24462 shows arrangements in which the two epicyclic shunts are co-axial with each other and with the transmission input, but the variator itself is laterally offset from their common axis. This is not always convenient from a packaging point of view, nor does it necessarily allow the number of gears in the power transfer paths to be minimized, and additional gearing is undesirable as it increases transmission energy dissipation.

A transmission which operates on essentially similar principles but has a different layout is disclosed in published international patent application WO94/16244, again in the name of Torotrak (Development) Limited. Its US counterpart is U.S. Pat. No. 5,564,998. In that transmission the two epicyclic gear arrangements are co-axial with, and on either side of, the variator, but the transmission's output is made through a lay shaft which is offset from the variator's axis, and this too can be problematic with regard to packaging.

The designations "input" and "output" have been used above and will be used repeatedly below with reference to the shafts or other rotary members through which components such as the variator—and indeed the transmission itself—couple to other components. It is a useful nomenclature to distinguish one side of the component from the other, but it should be understood that in most cases the designation is essentially arbitrary, and that the flow of power (while it is assumed to be from engine to wheels in the discussion below) will not necessarily always be from input to output.

SUMMARY

A first aspect of the present invention is intended to provide a multi-regime transmission which is energy efficient and/or economical to manufacture and/or convenient to package.

According to the first aspect of the present invention, there is a continuously variable transmission which has a transmission input and a transmission output and is adapted to transfer drive between them at a continuously variable transmission ratio, the transmission further comprising a variator having at least two variator races between which drive is transferred at a continuously variable variator ratio, the variator races being mounted for rotation about an axis defined by a variator shaft; a lay shaft laterally separated from the variator shaft; splitter epicyclic gearing having a splitter input member arranged to be driven from the transmission input and two splitter output members arranged to respectively drive the lay shaft and the variator shaft; recirculater epicyclic gearing having first and second recirculater input members, arranged to be operatively coupled respectively to the variator shaft and the lay shaft, and a recirculater output member; and a clutch arrangement for selectively engaging:—
  (a) a regime in which the recirculater output member drives the transmission output;
  (b) a regime in which the lay shaft drives the transmission output; and
  (c) a regime in which the variator shaft drives the transmission output; the variator shaft being co-axial
  the transmission output;
  the recirculater epicyclic;
  a first coupling, between the recirculater output member and the transmission output, which serves to drive the transmission output in regime (a); and
  a second coupling, between the variator shaft and the transmission output, which serves to drive the transmission output in regime (c).

A different problem relating to multi-regime transmissions concerns the practicalities of manufacture. Different vehicles have different requirements as to the number of regimes to be provided by the transmission. A large number of regimes allows the power handled by the variator to be reduced, as explained above. On the other hand transmissions providing as many as four different regimes can be bulky and relatively expensive to manufacture. It would be desirable to make it possible to use largely the same components and tooling for two different transmissions, one having the facility to provide more regimes than the other. This can be achieved by use of a single basic transmission providing the lower number of regimes, with optional additional components for providing an additional regime (or regimes).

In accordance with a second aspect of the present invention, the result of incorporating the additional components is a continuously variable transmission which is operable in at least four regimes and which has a transmission input and a final transmission output and is adapted to transfer drive between them at a continuously variable transmission ratio, the transmission further comprising a variator having at least two variator races between which drive is transferred at a continuously variable variator ratio, the variator races being mounted for rotation about an axis defined by a variator shaft; a lay shaft laterally separated from the variator shaft; splitter epicyclic gearing having a splitter input member arranged to be driven from the transmission input and two splitter output members arranged to respectively drive the lay shaft and the variator shaft; recirculater epicyclic gearing having first and second recirculater input members arranged to be operatively coupled respectively to the variator shaft and the lay shaft, and a recirculater output member; a shared output member arranged to be selectively operatively coupled to and decoupled from the final transmission output by means of a first clutch arrangement, and further clutch arrangements for:
  (a) coupling the recirculater output member to the shared output member and through it to the final transmission output, to provide one regime;
  (b) coupling the lay shaft to the shared output member and through it to the final transmission output, to provide another regime;
  (c) coupling the variator shaft to the shared output member and through it to the final transmission output, to provide another regime; and
  (d) coupling either the lay shaft or the variator shaft to the final transmission output via a separate path not including the shared output member, whilst the shared output member is decoupled from the final trans output, to provide another regime.

In accordance with a third aspect of the present invention, the additional components needed to provide the second regime can be formed as a unit for attachment to a continuously variable host transmission in order to provide the transmission with an additional regime, the unit comprising a rotary final transmission output, a first rotary input engage able with a first output of the host transmission, a second rotary input engage able with a second output of the host transmission, and an arrangement of gearing and clutches for selectively connecting the final transmission output to at least one of the first and second rotary inputs.

Typically the clutches used to select one regime or another are frictional devices, e.g. of wet plate type. While very widely available and effective, there are certain disadvantages associated with use of this type of clutch. By its nature it is subject to wear and hence to periodic renewal. The clutch chosen must be capable of handling the expected torque, and since this can be substantial in vehicles such as trucks the requirements of the clutch can be exacting. There is also the expense of wet plate clutches to be considered.

In accordance with a fourth aspect of the present invention, there is a multi regime continuously variable transmission comprising a variator providing a continuously able variator ratio, gearing defining at least two selectively engage able drive paths between a transmission input and a transmission output, both drive paths incorporating the variator so that in both the ratio of transmission input speed to transmission output speed is a function of variator ratio, and a regime change clutch arrangement, the transmission being characterized in that the regime change clutch arrangement comprises one or more dog clutches for changing from engagement of one drive path to engagement of the other, and in that the transmission further comprises at least one frictional engagement device which, when subject to excess torque, is able to slip and so to permit a mismatch between the variator ratio and the ratio of transmission input speed to transmission output speed.

The dog clutches are unable to slip and so cannot accommodate a mismatch between transmission input and output speeds. In the absence of the frictional engagement device, this could lead to excessive loading on other parts of the transmission such as the variator in the event of unexpected torque spikes, e.g. created by very hard braking by the driver. In such conditions the additional frictional engagement device is able to slip and so provide the transmission with the necessary protection.

BRIEF DESCRIPTION OF THE DRAWINGS

Specific embodiments of the present invention will now be described, by way of example only, with reference to the accompanying drawings, in which:

FIG. 2 shows the same variator, again in highly simplified form, viewed along a radial direction;

FIG. 3 is a schematic representation of a three regime CVT embodying the present invention;

FIG. 4 represents the same transmission in more detail;

FIGS. 5a-5c correspond to FIG. 4 except that in each the components included in the power path for a respective regime are highlighted in bold, other components being shown in faint print;

FIG. 8 represents a transmission which is a development of that seen in FIG. 7, being in some respects more simple to manufacture;

FIG. 9 represents the same transmission seen in FIG. 8 with additional gearing and related components to provide a fourth regime.

DETAILED DESCRIPTION

Figure 1:
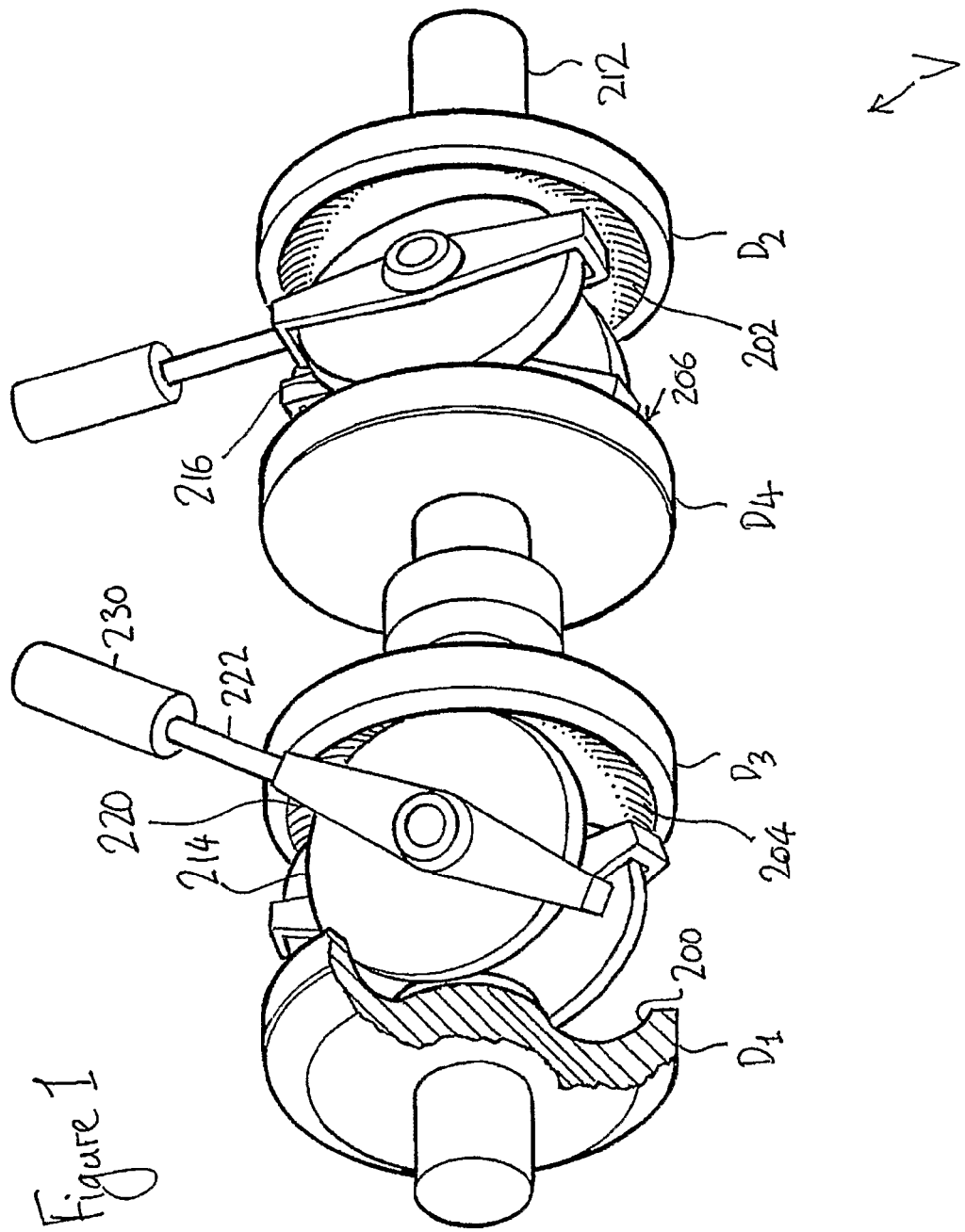
FIG. 1 is a highly simplified perspective illustration of major components of a toroidal race rolling traction variator suitable for use in implementing the present invention.

A variator V suitable for use in implementing the present invention will first be described with reference to FIGS. 1 and 2. The variator in question is known to those skilled in the art and is of toroidal-race rolling-traction type. Other types of variator could be used in transmissions embodying the invention. The variator V has first and second input races $D_1$, $D_2$ having respective semi-toroidally recessed faces 200, 202. Between the input races $D_1$, $D_2$ are first and second output races $D_3$, $D_4$, and these too have respective semi-toroidally recessed faces 204, 206, so that between the first input and output races $D_1$, $D_3$ is formed a first toroidal cavity 208, and between the second input and output races $D_3$, $D_4$ is formed a second toroidal cavity 210. The races have a common rotational axis (the "variator axis") defined by a variator shaft 212 about which they rotate.

Each cavity 208, 210 contains a respective set of rollers 214, 216. Typically each set consists of three rollers. Each roller is mounted for rotation about a roller axis and runs upon the toroidal faces of its associated input and output races to transfer drive from one to the other. Each of the rollers 214, 216 is able to move back and forth along a circumferential direction about the variator axis. It is also able to precess. That is, the roller's axis is able to turn, changing the inclination of the roller axis to the variator axis. In the illustrated example, these motions are provided for by rotatably mounting each roller 214, 216 in a respective carrier 220 coupled by a stem 222 to a piston 228 of an actuator 230. A line 232 from the centre of the piston 228 to the centre of the roller 216 constitutes a precession axis about which the whole assembly can turn. Precession of the roller results in changes of the radii of the paths traced upon the races such as $D_2$, $D_4$ by the roller such as 216, and hence in a change of variator drive ratio.

Note that in this example the precession axis 232 does not lie precisely in a plane perpendicular to the variator axis, but is instead inclined to this plane. The angle of inclination is labeled CA in the drawing, and is known as the "castor angle". As the roller moves back and forth it follows a circular path centered upon the variator axis. Furthermore the action of the races upon the roller creates a steering moment which tends to maintain it at such an inclination that the roller axis intersects the variator axis. This intersection of the axes can be maintained, despite movement of the roller back and forth along its circular path, by virtue of the castor angle. As the roller moves along its path, it is also steered by the action of the races, causing it to precess such as to maintain the intersection of the axes. The result is that the position of the roller along its path corresponds to a certain roller inclination and hence to a certain variator drive ratio.

The actuator 230 receives opposed hydraulic fluid pressures through lines 234, 236. The force thus created by the actuator 230 urges the roller along its circular path about the variator axis, and at equilibrium it is balanced by forces exerted upon the roller by the races. The force exerted by the races is proportional to the sum of the torques externally applied to the variator races. This sum—the variator input torque plus the variator output torque—is the net torque that must be reacted to the variator's mountings, and is referred to as the reaction torque. By setting the pressures in lines 234, 236, the reaction torque created by the variator is directly controlled.

A transmission incorporating the variator V will now be described. The principles of operation of the present transmission can best be understood with reference to FIG. 3, which shows its main functional components in a purely schematic form. Input shaft 10 is driven by a rotary power source 12, which in the present example is a diesel engine although in principle it could be any type of internal combustion engine, motor—electric or otherwise—external combustion engine or other rotary driver. A splitting epicyclic 14 has three rotary elements which are connected respectively to (i) the input shaft 10, (ii) a first intermediate shaft 16, and (iii) a second intermediate shaft 18. The last of these connections is via gearing $R_1$. Power input from the engine to the splitting epicyclic 14 is directed to the intermediate shafts 16, 18, but the division of this power between the two mediate shafts and their relative speeds are not determined by the splitting epicyclic.

The variator V is connected across the first and second intermediate shafts. Specifically, the variator's rotary input is connected to the first intermediate shaft 16 and its output is connected via gearing $R_2$ to the second intermediate shaft 18. The speed ratio of the first to the second intermediate shafts is thus equal to the variator ratio, multiplied by the gear ratio $R_2$. A variator ratio change—at constant speed of the input shaft 10—causes one of the intermediate shafts to slow down and the other to speed up.

The transmission has a rotary output shaft 20 which, in the case of a vehicle transmission, typically coupled via final gearing to the vehicle wheels. In the illustrated example, there are three available routes for power transfer to the output shaft 20, each of them engageable by means of a respective clutch $M_1$, $M_2$, $M_3$ and each of them providing a different transmission regime.

The lowest regime is active when clutch $M_1$ is engaged and the other clutches disengaged. In the illustrated example clutch $M_1$ is actually a brake acting upon the planet carrier of a coupling epicyclic gear 22. This particular epicyclic serves simply as a coupling and performs no mixing function. When clutch $M_1$ is engaged it transfers drive to the output shaft 20 and provides a fixed gear ratio. When clutch $M_1$ is disengaged the coupling epicyclic gear 22 freewheels and transmits no significant power. An epicyclic gear has the advantage in this context that its input and output are co-axial, which is constructionally convenient.

Power is transferred to the coupling epicyclic gear 22 via recirculating epicyclic gear 24 which has a first input 26 connected to the first intermediate shaft 16, a second input 28 connected via gearing $R_3$ to the second intermediate shaft 18, and an output 30 leading to the coupling epicyclic gear 22. It is by virtue of the recirculating epicyclic gear 24 that the transmission is able to provide geared neutral. At the geared neutral variator ratio, the speeds of its first and second inputs 26, 28 cancel each other out and its output 30 is consequently stationary regardless of the speed of the engine 12, despite being mechanically coupled to the engine. In some embodiments, variator ratios to one side of the geared neutral ratio provide reverse output rotation (reverse vehicle motion) and variator ratios to the other side of geared neutral provide forward output rotation (forward vehicle motion).

A change from the lowest regime—the first—to the second regime is carried out by disengaging clutch $M_1$ and engaging clutch $M_2$. This is done at synchronous ratio so that no instantaneous change in transmission ratio results. The coupling epicyclic gear 22 and the recirculating epicyclic gear 24 then freewheel and are effectively removed from the power supply path. Output shaft 20 is instead driven from the second intermediate shaft 18 via gearing $R_4$.

A change from second to third regime is carried out by disengaging clutch $M_2$ and engaging clutch $M_3$, which is again carried out at synchronous ratio. The path for supply of power is then made through a direct coupling of the first intermediate shaft 16 to the output shaft 20.

Note that as the transmission traverses its entire ratio range, the variator ratio is first swept through its range in the first regime, then back through its range—in the opposite direction—in the second regime, then back again through its range—in the first direction—in the third regime. The choice of the gear ratios R is such that first, second and third regimes provide successively higher overall transmission ratios—i.e. more output revolutions per input revolution.

FIGS. 4 and 5 represent a practical embodiment of the same transmission seen in FIG. 3. Here, the first intermediate shaft 16 is formed by the main shaft of a toroidal-race rolling-traction variator V of the type described above. The second intermediate shaft 18 is formed as a lay shaft laterally offset from the variator. The outer variator races $D_1$, $D_2$ are mounted on the first intermediate shaft 16 to rotate along with it, so that drive is directly transferred from races to shaft (or vice versa—the direction of power flow can be in either direction). Drive from the inner variator races $D_3$, $D_4$ is taken off through a first chain gear 32 between them which drives a second chain gear 34 on the second intermediate shaft 18 through a chain (not shown), forming the gearing $R_2$ of FIG. 3. Other lateral drive transfer arrangements could be used in this context, such as directly meshing gears.

The splitting epicyclic 14 is co-axial with the variator races $D_1$-$D_4$. In the illustrated embodiment it is disposed between the input shaft 10 and the variator V. The input shaft 10 carries planet carrier $S_{PC}$ of the splitting epicyclic 14. Planets 36 carried thereupon mesh with sun gear $S_S$, which is mounted on the first intermediate shaft 16, and also with internally toothed ring gear $S_R$, which is also toothed on its exterior to engage with a first lay shaft gear 38, mounted on the second intermediate shaft (lay shaft) 18. The external teeth of the ring gear $S_R$ and the first lay shaft gear 38 together form the gearing $R_1$ of FIG. 3.

The recirculating epicyclic 24 is co-axial with the variator races $D_1$-$D_4$. In the illustrated embodiment it is on the opposite side of the variator from the power splitting epicyclic 14. The recirculating epicyclic 24 comprises a sun gear $RE_S$ mounted on the first intermediate shaft (variator shaft) 16, which meshes with planet gears 40 carried upon a planet carrier $RE_{PC}$. The planet gears 40 also mesh with an internally toothed ring gear $RE_R$ of the recirculating epicyclic 24, and this ring gear is also externally toothed to mesh with a second lay shaft gear 42 mounted on the second intermediate shaft (lay shaft) 18. The external teeth of the ring gear $RE_R$ and the second lay shaft gear 42 form the gearing $R_3$ of FIG. 3.

The coupling epicyclic 22 is adjacent to and outboard of the recirculating epicyclic 24. Its sun gear $CE_S$ is directly coupled to the planet carrier $RE_{PC}$ of the recirculating epicyclic and meshes with planets 44 carried upon a planet carrier $CE_{PC}$. The planets 44 also mesh with a ring gear $CE_R$ of the coupling epicyclic 22 which is itself directly coupled to the transmission output shaft 20. The first regime clutch $M_1$ is in this particular embodiment formed as a brake, engagement of which locks the coupling epicyclic's planet carrier $CE_{PC}$ against rotation and enables the coupling epicyclic 22 to transmit power from the planet carrier $RE_{PC}$ of the recirculating epicyclic 24 to the transmission output shaft 20. Releasing the clutch/brake $M_1$ permits the planet carrier $CE_{PC}$ to freewheel and prevents such transfer of power, effectively de-coupling planet carrier $RE_{PC}$ from the output shaft 20.

The second regime clutch $M_2$ serves to couple/decouple the output shaft 20 to/from an output gear 46 which is co-axial with the output shaft 20 and which meshes with a third lay shaft gear 48 mounted on the second intermediate shaft (lay shaft) 18, these gears together providing the ratio $R_4$ of FIG. 3.

The first intermediate shaft (variator shaft) 16 is co-axial with the transmission output shaft 20, and the third regime clutch $M_3$ is interposed directly between the two to selectively couple/de-couple them.

The paths for transmission of power in the three regimes can be appreciated from FIGS. 5a-c, in which the engaged clutch and the active components—those serving to transfer power—are shown in bold for the three different regimes.

The transmission described above provides three regimes. For some vehicles, it may be desirable to provide still more regimes. Increasing the number of regimes can allow the power handled by the variator to be reduced, and so allow efficiency to be improved, as explained above. It can also be used to provide for an especially wide ratio spread which is desirable for example for trucks, which may be operated for long periods at largely constant speed on fast roads. In such conditions a very high "overdrive" gear can allow the engine to be operated in its most efficient condition. On the other hand transmissions providing four or more regimes are not necessarily desirable for other vehicles. They may be unduly expensive to manufacture and/or too bulky to be accommodated in the vehicle. Manufacture of two entirely different transmissions, to meet these conflicting requirements, is economically unattractive.

Figure 6:
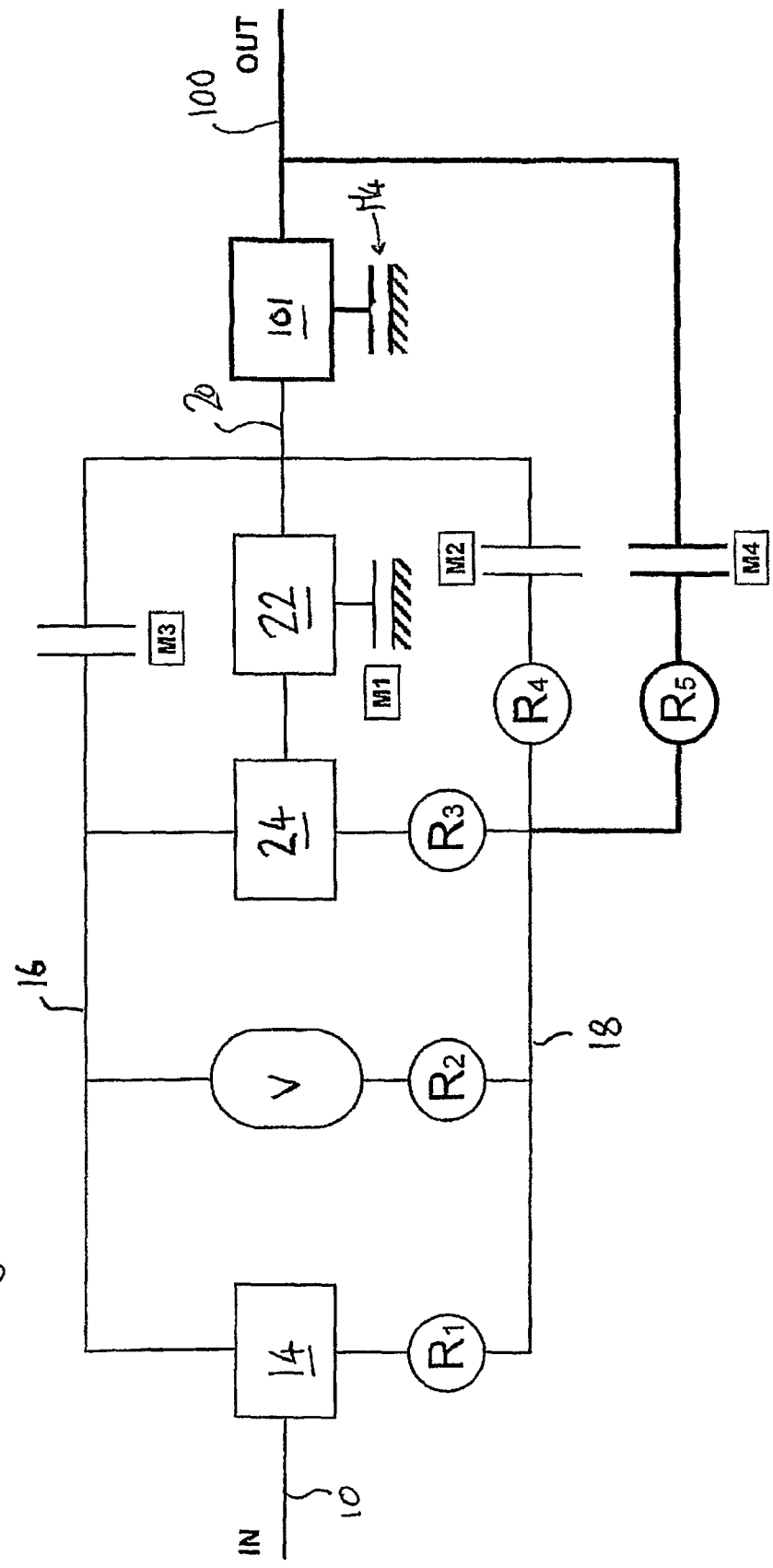
FIG. 6 represents the same CVT seen in FIGS. 3 and 4 with additional gearing and related components to provide a fourth regime.

An additional—fourth—regime can however be provided simply by adding further clutches and gearing to the transmission of FIGS. 3 to 5, without substantial modification of it. FIG. 6 illustrates the principle and corresponds to FIG. 3 (identical parts being given the same reference numerals) except that a fourth route for transmission of power to the output is provided through gearing $R_5$ coupled to the second intermediate shaft 18, and through a fourth regime clutch $M_4$. In this particular embodiment the speed of the existing transmission output shaft 20 is also modified by fixed ratio gearing, formed as an epicyclic 101, and transmitted to a final output shaft 100, thereby changing the ratio ranges provided in regimes 1-3.

Figure 7:
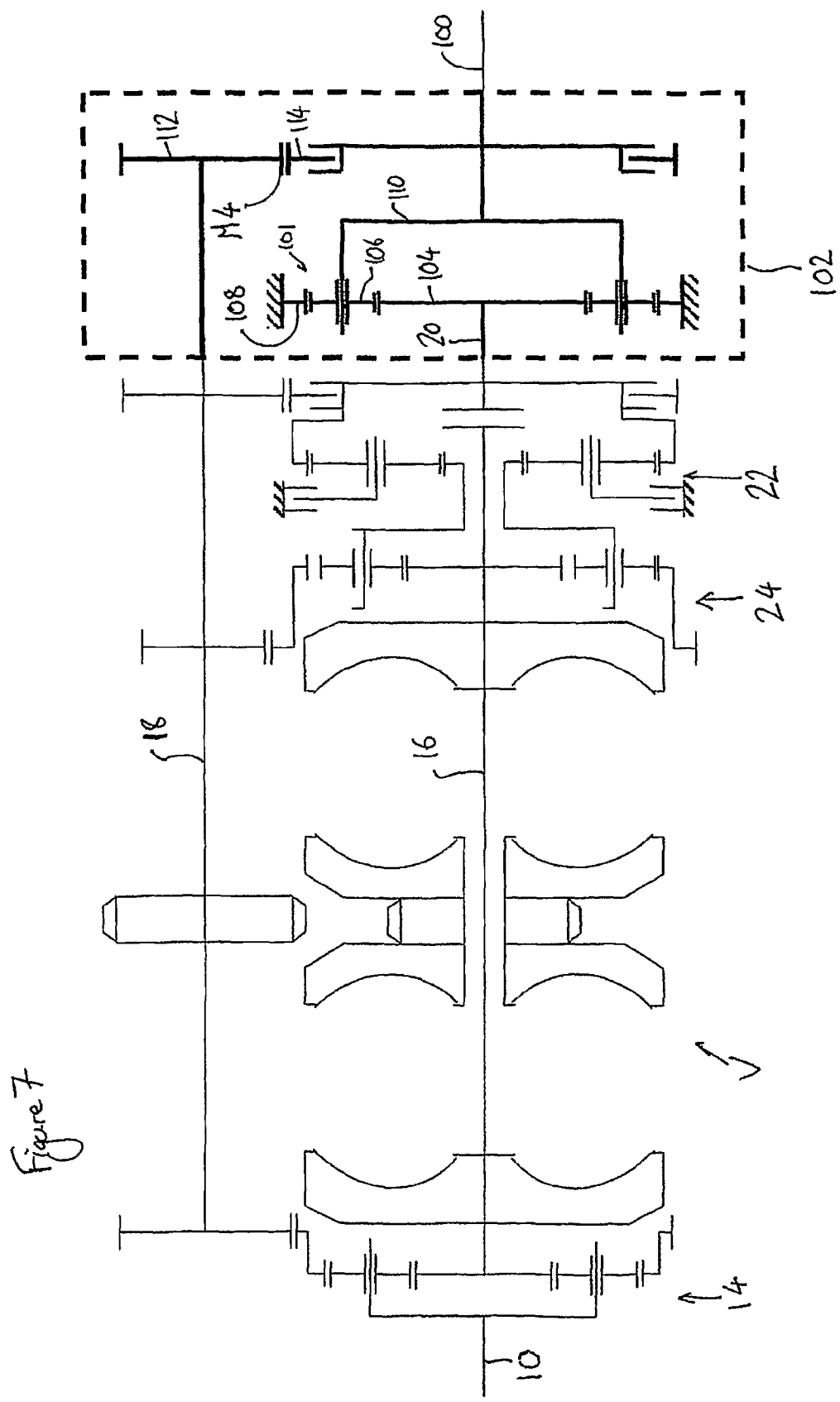
FIG. 7 represents the FIG. 6 transmission in more detail.

FIG. 7 shows a practical embodiment of the FIG. 6 transmission. The additional components which provide the fourth regime are in this example formed in a separate regime unit 102 which is attached to the main transmission housing (not shown). The existing transmission output shaft 20 extends into the regime unit 102, and so does the second intermediate shaft (lay shaft) 18.

In first, second and third regimes, power is transmitted from the existing output shaft 20 via the fixed ratio gearing 101 to the final output shaft 100. Fixed ratio gearing 101 comprises a sun 104 carried on the existing output shaft 20, planet gears 106 meshing with the sun 104 and with a fixed ring gear 108, and a planet carrier 110 mounted on the final output shaft 100. Epicyclic gearing is used here as a convenient and co-axial way to provide a fixed gear ratio.

In fourth regime power is transmitted from the second intermediate shaft (lay shaft) 18 via a fourth lay shaft gear 112, a second output gear 114 and the (engaged) clutch $M_4$ to the final output shaft 100. The fourth lay shaft gear 112 and the second output gear 114 together form the gearing $R_5$ of FIG. 6.

FIG. 8 shows a three regime transmission which is similar to that of FIGS. 3 to 5 but is intended to be more economical to manufacture and more efficient. The power splitting epicyclic 14, variator V, first and second intermediate shafts (variator shaft and lay shaft) 16, 18, chain gears 32, 34 and the recirculating epicyclic 24 all correspond to those described with reference to FIGS. 3 to 5, and will not be described again. The coupling epicyclic 22 of FIG. 3 has been dispensed with. The ring gear $RE_R$ of the recirculating epicyclic 24 is in the FIG. 8 embodiment operatively coupled to the second intermediate shaft (lay shaft) 18 by a chain drive through gears 200, 202 (the chain being omitted from the drawing), in place of the directly meshing gears of the earlier embodiment.

In previously described embodiments the regime clutches $M_1$-$M_4$ were frictional devices such as wet plate clutches able to slip—i.e. to accommodate a mismatch of speeds between their input and their output whilst partially engaged, and in this condition to transmit some torque. Slip could in principle occur during the process of engagement/disengagement, and/or in response to excessive torque loading upon the clutches.

By contrast in the FIG. 8 embodiment the regime clutches $M_1$-$M_3$ are dog clutches. That is to say that they are able to transmit torque not by virtue of friction, but of interference between mechanically interengaging parts. Many different forms of dog clutch are known in the art and could be adopted in the present embodiment. A dog clutch is unable to accommodate slip while engaged. It is therefore not subject to frictional wear and is likely to require renewal infrequently. Dog clutches are also well suited to handling large torques.

In the FIG. 8 embodiment a single actuator is used to control the clutches $M_1$, $M_3$ for both first and third regimes. These clutches have respective input members 200, 202 and a common clutch output member 204 which is movable axially to selectively (i) engage with input member 200 of clutch $M_1$, to engage first regime, (ii) disengage from both output members, and (iii) engage with input member 202 of clutch $M_3$, to engage third regime. The clutch output member 204 is coupled to the transmission output shaft 20. The use of a single actuator for two clutches potentially improves reliability and reduces manufacturing costs.

FIG. 9 illustrates a development of the FIG. 8 transmission providing four regimes. Like the four regime transmission of FIG. 7, it has a fixed ratio epicyclic gear 101 interposed between the output shaft 20 and the final output shaft 100, and a fourth regime clutch $M_4$ for coupling the final output shaft 100 to the second intermediate shaft (lay shaft) 18 via gearing 112, 114.

The second and fourth regime clutches $M_2$, $M_4$ are in this embodiment controlled by a single actuator and formed as a single unit. They have respective clutch input members 210, 212 but share a common clutch output member 214 which is coupled to the second intermediate shaft (lay shaft) 18. By moving the clutch output member 214, the actuator can engage either of the clutches $M_2$, $M_4$, or disengage them both.

In the FIG. 9 embodiment a friction clutch 220 is provided between the transmission input shaft 10 and the rotary power source 12. This clutch can be used to provide the transmission/engine with protection against undue torque, by slipping when excessively loaded. For example the friction clutch 220 may be a hydraulically actuated wet plate clutch whose hydraulic control pressure—and consequent torque capacity—is constantly adjusted such that the clutch is able to transmit the expected torque, but will slip in response to an unanticipated torque spike created for example by emergency braking. This protective function could have been provided by the regime clutches $M_1$-$M_4$ had they been of friction engagement type as in earlier embodiments.

What is claimed is:

1. A continuously variable transmission which has a transmission input and a transmission output and is adapted to transfer drive between them at a continuously variable transmission ratio, the transmission further comprising a variator having at least two variator races between which drive is transferred at a continuously variable variator ratio, the variator races being mounted for rotation about an axis defined by a variator shaft; a layshaft laterally separated from the variator shaft, wherein coupling of the layshaft to the transmission output is made through a gear arrangement which provides a reversal of rotational direction; splitter epicyclic gearing having a splitter input member arranged to be driven from the transmission input and two splitter output members arranged to respectively drive the layshaft and the variator shaft; recirculater epicyclic gearing having first and second recirculater input members, arranged to be operatively coupled respectively to the variator shaft and the layshaft, and a recirculater output member; and a clutch arrangement for selectively engaging:

(a) a regime in which the recirculater output member drives the transmission output;
(b) a regime in which the layshaft drives the transmission output; and
(c) a regime in which the variator shaft drives the transmission output; the variator shaft being co-axial with:
the transmission output:
the recirculater epicyclic;
a first coupling, between the recirculater output member and the transmission output, which serves to drive the transmission output in regime (a); and
a second coupling, between the variator shaft and the transmission output, which serves to drive the transmission output in regime (c).

2. A continuously variable transmission as claimed in claim 1 in which one of the first and second couplings comprises a sleeve or other member which is co-axial with and rotates around the variator shaft.

3. A continuously variable transmission as claimed in claim 1 in which one of the first and second couplings comprises a coupling epicyclic gear which is co-axial with the variator shaft.

4. A continuously variable transmission as claimed in claim 3 in which the coupling epicyclic gear comprises an input member, an output member connected to the transmission output, and a further member which is associated with a first clutch for selectively:
preventing rotation of the further member, causing the coupling epicyclic to transfer drive at a fixed ratio, and
permitting the further member to freewheel and so effectively de-coupling the input and output members.

5. A continuously variable transmission as claimed in claim 3 in which the coupling epicyclic gear has an output member connected to a clutch for selectively coupling/decoupling the said output member to/from the transmission output.

6. A continuously variable transmission as claimed in claim 3 in which the coupling epicyclic serves to selectively couple the recirculater output member to the transmission output.

7. A continuously variable transmission as claimed in claim 1 in which the second coupling is through a clutch mounted on the axis of the variator shaft, engagement of the clutch directly coupling the variator shaft to the transmission output.

8. A continuously variable transmission as claimed in claim 1 comprising a clutch arrangement which has a clutch output member coupled to the transmission output and two clutch input members, one coupled to the recirculater output and the other coupled to the variator shaft, the clutch output member being selectively engageable with both of the clutch input members to engage regimes (a) and (c).

9. A continuously variable transmission as claimed in claim 1 in which coupling of the variator shaft to the transmission output is made selectively through a clutch mounted co-axially with the variator shaft, so that engagement of this clutch engages regime (c).

10. A continuously variable transmission as claimed in claim 1 in which the variator comprises a pair of output races disposed between a pair of input races, and in which the output races are coupled to the layshaft through a chain or geared drive.

11. A continuously variable transmission as claimed in claim 1 in which the splitter epicyclic is co-axial with the variator shaft and is on the opposite side of the variator from the recirculater epicyclic.

12. A continuously variable transmission as claimed in claim 1 which provides at least four regimes, the transmission having a final output, a first additional clutch arrangement for selectively coupling the transmission output to the final output, and a second additional clutch arrangement for selectively coupling the final output to one of the variator shaft and the layshaft.

13. A continuously variable transmission as claimed in claim 1 in which the final output is co-axial with the transmission output.

14. A continuously variable transmission as claimed in claim 13 in which selective coupling of the final output to the transmission output is made through a second coupling epicyclic, locking one member of which causes it to transmit power and releasing the same member of which prevents it from transmitting power.

* * * * *